United States Patent [19]
Abby

[11] Patent Number: 5,809,686
[45] Date of Patent: Sep. 22, 1998

[54] FLY TYING DEVICE

[76] Inventor: Ronald R. Abby, 70 Industrial Dr., Cloverdale, Calif. 95425

[21] Appl. No.: 716,935

[22] Filed: Sep. 20, 1996

[51] Int. Cl.[6] .................................................. A01K 83/06
[52] U.S. Cl. ................................ 43/42.53; 43/4; 269/907
[58] Field of Search ................................ 269/907; 43/1, 43/42.53, 4

[56] References Cited

U.S. PATENT DOCUMENTS

| 4,169,562 | 10/1979 | Renzetti | 43/1 |
|---|---|---|---|
| 4,544,145 | 10/1985 | Norlander | 269/69 |
| 5,165,673 | 11/1992 | Newton, Jr. | 269/69 |
| 5,169,079 | 12/1992 | Renzetti | 43/1 |

*Primary Examiner*—J. Woodrow Eldred
*Attorney, Agent, or Firm*—Larry D. Johnson

[57] ABSTRACT

A device for tying artificial flies onto the shank of a fishing hook by wrapping a filament about the shank includes a shaft which is rotatable about a first axis and having a releasable clamp mounted thereon at an angle to the shaft. The clamp includes hook engaging jaws which are located immediately adjacent to the axis of the shaft for holding a portion of the hook adjacent to the hook shank, so that the shank is fully exposed and disposed coaxially with the first axis. The shaft is supported and rotatable about the first axis, and can be held at any rotational position.

4 Claims, 4 Drawing Sheets

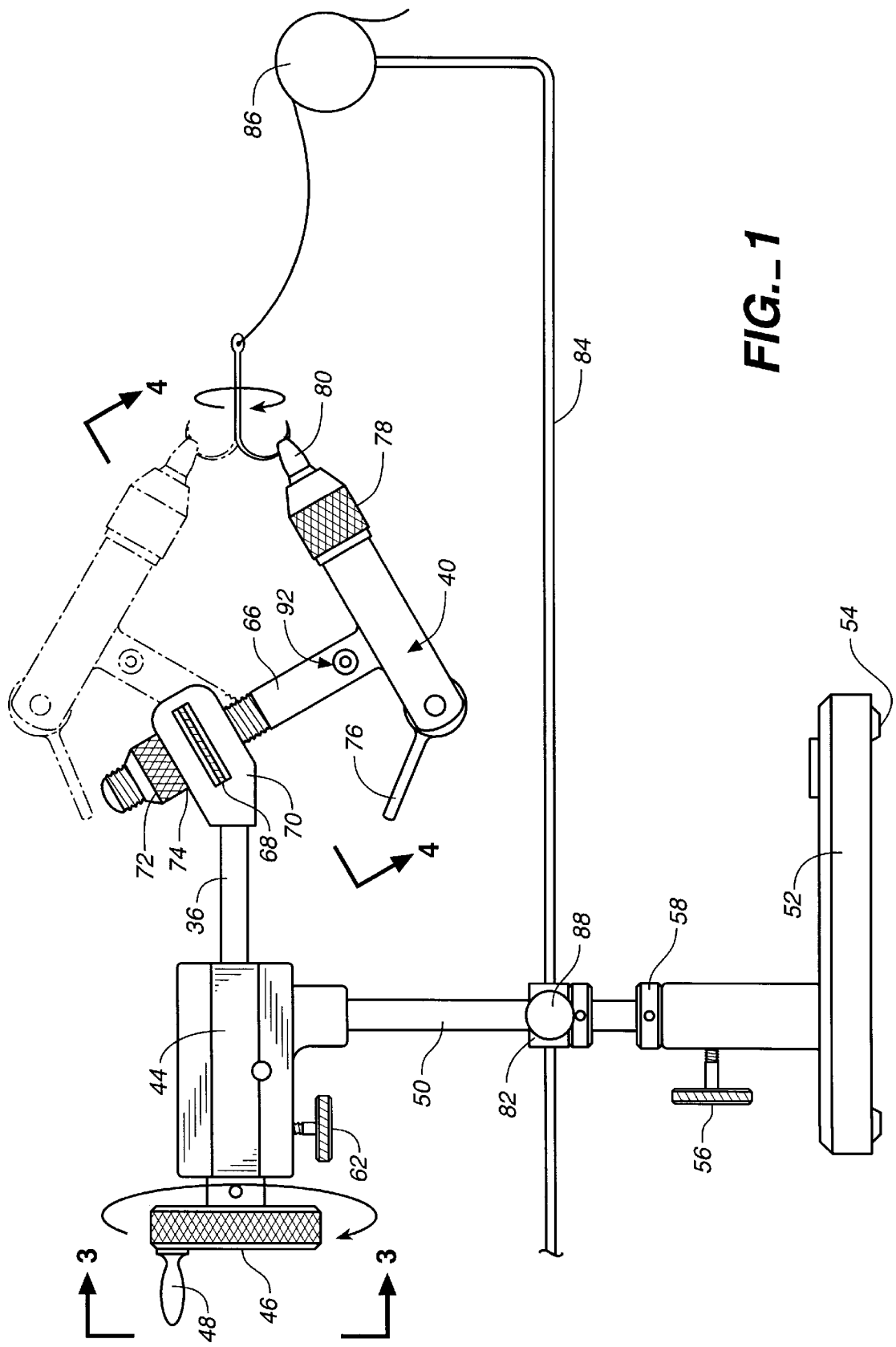
FIG._1

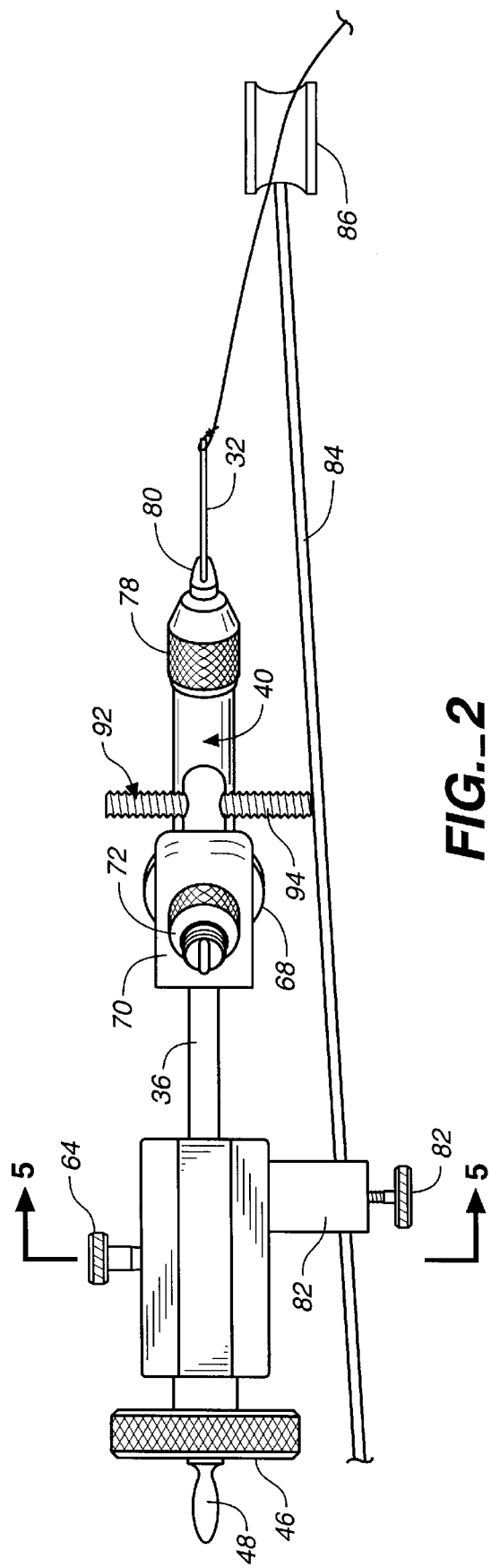
FIG._2

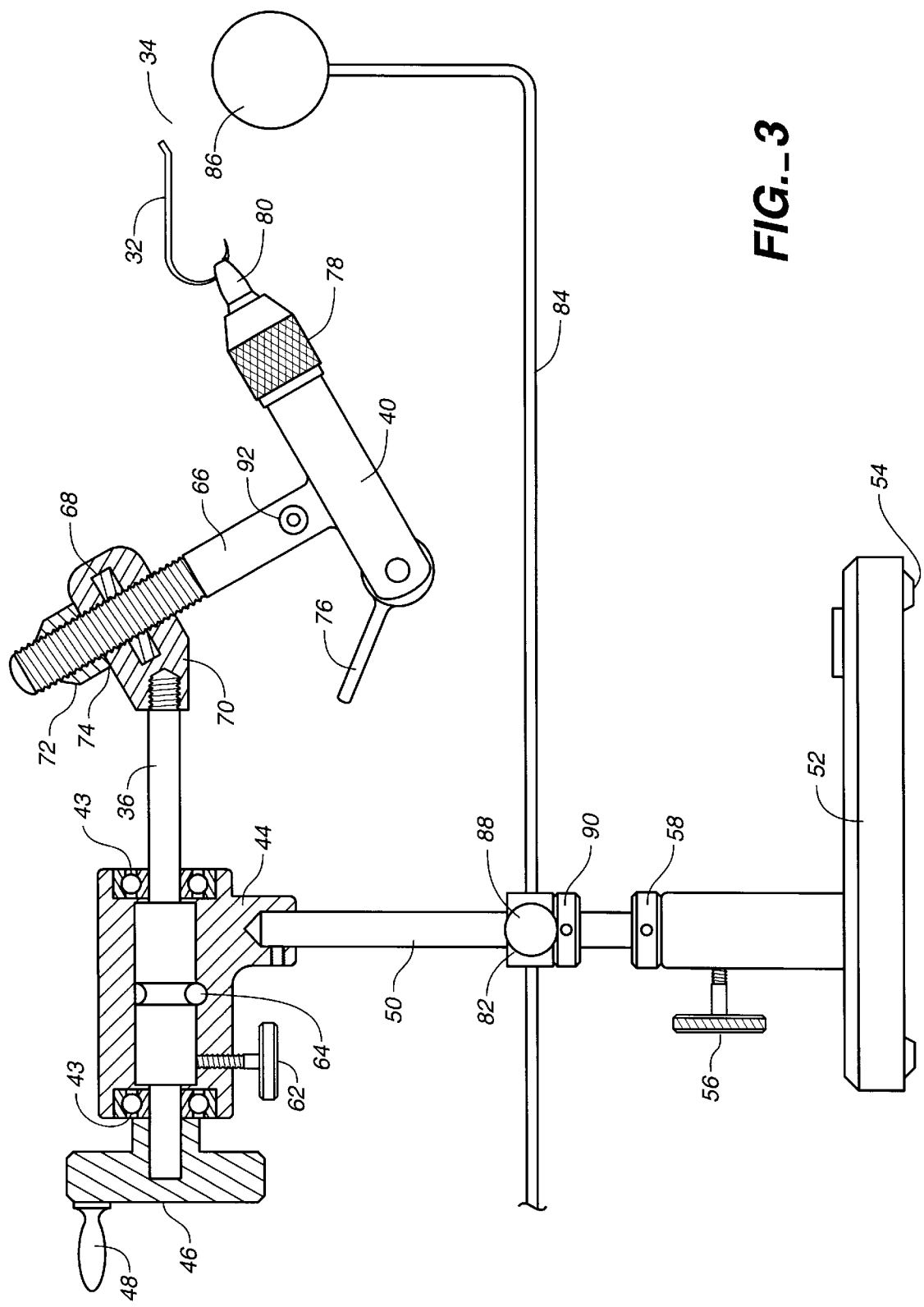
FIG._3

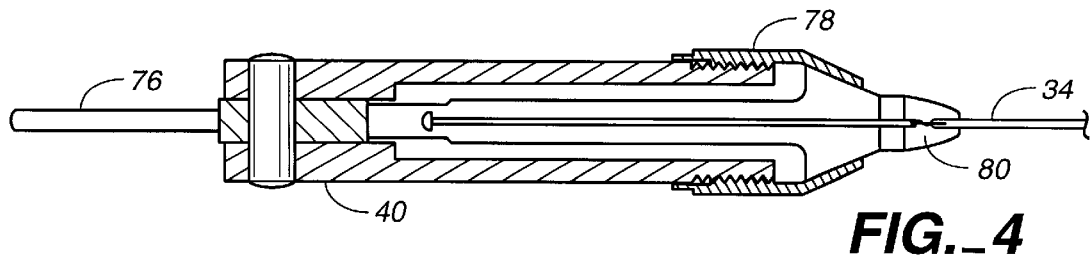
FIG._4
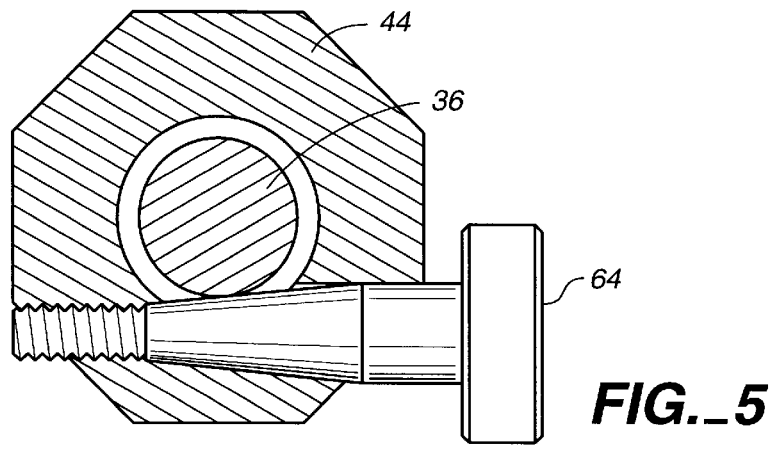
FIG._5
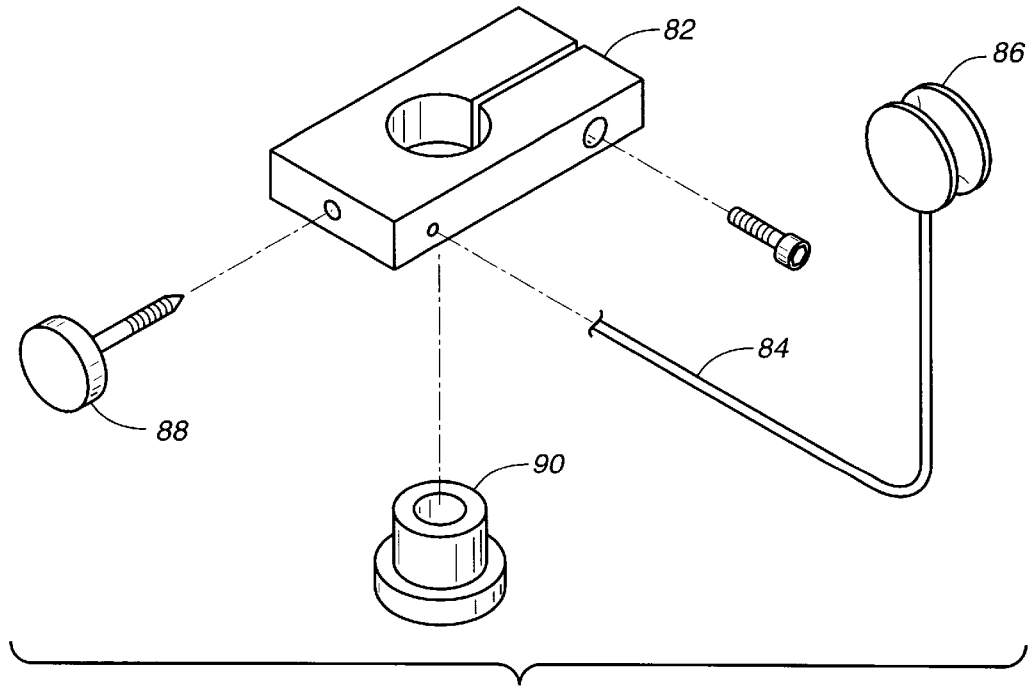
FIG._6

FLY TYING DEVICE

BACKGROUND OF THE INVENTION

1. Field of the Invention

This invention relates generally to holding devices, and more specifically to devices for holding fish hooks or other similar objects upon which various materials are tied or fastened to make artificial flies and lures.

2. Description of the Prior Art

Various clamping, support and holding devices for facilitating the tying of flies, insects or lures onto fish hooks have been disclosed in the patent literature, e.g., U.S. Pat. No. 2,120,571 (Reichenstein et al), U.S. Pat. No. 2,166,585 (Evans), U.S. Pat. No. 2,236,781 (Pannier), U.S. Pat. No. 2,486,142 (Fong), U.S. Pat. No. 3,060,613 (Murray), U.S. Pat. No. 3,520,566 (Bovigny), U.S. Pat. No. 4,169,562 (Renzetti), U.S. Pat. No. 4,184,645 (Starling), U.S. Pat. No. 4,216,948 (Carter), U.S. Pat. No. 4,544,145 (Norlander), and U.S. Pat. No. 5,169,079 (Renzetti).

While each of these devices may exhibit one or more advantages, none provide the tier with a device which is readily adjustable for various applications, while enabling full and unrestricted exposure of the hook and ease of manipulation and rotation thereof to facilitate the tying procedure.

OBJECTS AND ADVANTAGES

Accordingly, it is a general object of the instant invention to provide a holding device which overcomes the disadvantages of the prior art.

It is a further object of the instant invention to provide a device for supporting a hook and for rotating the same about the axis of its shank to facilitate the tying of a fly thereon.

It is a further object of the instant invention to provide a fly tying apparatus which is readily adjustable.

Other objects and many of the attendant advantages of this invention will be readily appreciated as the same becomes better understood by reference to the following detailed description when considered in connection with the accompanying drawings.

SUMMARY OF THE INVENTION

The fly tying device of this invention provides a device for tying artificial flies onto the shank of a fishing hook by wrapping a filament about the shank. The device includes a shaft which is rotatable about a first axis and having releasable clamping means mounted thereon at an angle to the shaft. The clamping means includes hook engaging jaws which area located immediately adjacent to the axis of the shaft for holding a portion of the hook adjacent to the hook shank so that the shank is fully exposed and disposed coaxially with the first axis. Means for rotating the shaft about the first axis and for holding the shaft at any rotational position are provided, as is support means for the shaft.

BRIEF DESCRIPTION OF THE DRAWINGS

FIG. 1 is a side elevation view of a fly tying device of the instant invention shown in the process of tying a fly on a hook;

FIG. 2 is a top plan view of FIG. 1;

FIG. 3 is a sectional view taken along line 3—3 of FIG. 1;

FIG. 4 is a sectional view taken along line 4—4 of FIG. 1;

FIG. 5 is a sectional view taken along line 5—5 of FIG. 2; and

FIG. 6 is an exploded isometric view of a mount bearing sub-assembly.

DETAILED DESCRIPTION OF A PREFERRED EMBODIMENT

As can be seen in FIGS. 1 and 3, the spindle 36 is an elongated member having external threads on one end. The adjustor body 70 has a mating internal thread and is attached thereby to the end of shaft 36. The adjustor body 70 carries adjustor nut 68 (fixable by lock nut 72 and plastic washer 74) which when rotated about the axis of threaded shank 66 will raise or lower the clamping body 40 so as to adjust the proximity of shanks 32 of various size hooks 34 held by jaws 80, to coincide with the axis of rotation of spindle 36. The adjustor body 70 holds shank 66 at such an angle with the axis of rotation as to allow a maximum of work area in which to construct a fly upon the hook shank.

A material clip 92 is mounted on each side of shank 66 to hold long fibers, feathers, or other tying materials clear of the tying area. As can be seen in FIG. 2, interstices between contiguous loops of springs 94 serve as niches for the receipt of these aforementioned materials. Since the clips 92 rotate with hook clamping means 40, tying materials attached by one end to the hook and to be utilized at a later step in the tying procedure, may be retained by the clip springs 94, thus allowing these materials to be carried along with the clamping body 40 in which hook 34 is being held, in such manner as to prevent entanglement of the tying materials.

Thread and tools used to carry thread may be draped over bobbin rest 86, which when pivoted in its mount 82 on bearing 90 about shaft 50 to a position in alignment with axis 38, will allow wrapping of other tying materials without encroachment in the tying area by supporting the thread dispensing device on rest 86. The weight of the thread tool called a bobbin, will maintain adequate tension on the thread so to prevent unraveling during rotation about axis 38. Bobbin rest 86 is able to be moved out of the way when not in use by pivoting about shaft 50. The length of bobbin support rod 84 allows great longitudinal as well as lateral adjustment. Rod lock screw 88 secures shaft 84 in mount 82.

Adjustment of height is accomplished by means of shaft 50, being manually moved in a vertical plane in pedestal base 52 upon rubber pads 54. Positive elevational adjustment is maintained by a set-collar 58 in the desired position. Pedestal lock screw 56 prevent accidental rotation of the shaft 50.

During the tying procedure, handwheel 46, mounted on the end of spindle 36 opposite the end carrying the adjustor body 70, is rotated by means of handle 48. Rotation of the handwheel 46 facilitates rotation of shaft 36 and the clamping device 40 in which a hook is secured.

Referring back to FIGS. 1 and 3, the device for holding a fish hook on which a fishing fly is to be tied includes a rotatable shaft 36 supported in two bearings 43 mounted in a housing 44. A vertical rod 50 extending from a pedestal base 52 provides a means of height adjustment and supports the housing 44 containing the bearings and shaft 36. A handle 48 on one end of the shaft facilitates rotation. A clamping body or hook-holding element 40, also adjustable for height, is mounted on the other end of the shaft, and consists of a cylinder having a cam 76 in one end and a cone 78 having an internal taper on the opposite end. Rotation of the cam causes a pair of jaws 80 having an external taper to move longitudinally within the cylinder and into the cone, mating the external taper of the jaws with the internal taper of the cone, and effecting a clamping action of the jaws on a fish hook. The radial surface of the cam has a notch which engages the shank end of the jaws and establishes a limit to the range of rotation of the cam, thus providing a means of precisely repeating the hook-clamping force on the jaws.

Proximal adjustment between the rotational axis of the shaft and that of the hook-holding element is accomplished by means of a threaded shank 66 attached to the hook-holding element 40 and which passes through a terminal fitting on the shaft end opposite the handle. A nut 68 contained within the terminal fitting provides the adjustment to coincide the two axes of rotation. A rod 84 mounted in a pivotable base 82 around the supporting shaft 50 of the bearing housing 44 extends to the tying area of the device and is capped with a rest 86 for a thread bobbin. Mounted on each side of the threaded shank 66 of the hook-holding device are two material retainers, consisting of sections of wire springs 94 held within cylinders which have cut-out sections to allow insertion of various fly tying materials between the coils of the springs, retaining these materials to prevent tangling and distortion of the fly during rotation of the device.

FIG. 5 illustrates a thumb screw 64 having a tapered section, which is located in the bearing housing 44 perpendicularly to the rotatable shaft 36 and engages a radiused groove of the shaft in a tangential position that allows the tapered portion of the screw to contact the radiused surface of the groove, imparting a frictional resistance to rotation of the shaft. Adjustment of the thumb screw provides a means to vary the amount of drag. A second thumb screw 62 (FIGS. 1 and 3) enters the bottom surface of the bearing housing. When tightened, the screw bears against the rotatable shaft 36, preventing rotation.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. A fly tying device for tying artificial flies onto a fishing hook shank by wrapping a filament about the fishing hook shank, said device comprising:

a shaft rotatable about a shaft axis, said shaft connected to an adjustment member engaging a threaded shank adapted to raise or lower a clamping body when said adjustment member is turned, said clamping body including fishing hook engaging jaws; and means for rotating said shaft about said shaft axis, wherein turning of said adjustment member raises or lowers said clamping body to move a fishing hook shank captured in said engaging jaws to coincide with the shaft axis.

2. The fly tying device of claim 1 further including means for holding said shaft at any rotational position.

3. The fly tying device of claim 1 wherein said threaded shank has a pair of sides, and further including fly tying material retaining members on each side of said threaded shank.

4. The fly tying device of claim 1 wherein said clamping body comprises a cam adapted to move tapered jaw members within a cylinder to effect a clamping motion on a fishing hook.

* * * * *